US011061809B2

(12) United States Patent
Peterson et al.

(10) Patent No.: US 11,061,809 B2
(45) Date of Patent: Jul. 13, 2021

(54) SOFTWARE DEBUGGING SYSTEM WITH IMPROVED TEST EXECUTION AND LOG FILE TRACKING

(71) Applicant: Red Hat, Inc., Raleigh, NC (US)

(72) Inventors: Michel Peterson, Ra'anana (IL); Michael Kolesnik, Netanya (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/425,480

(22) Filed: May 29, 2019

(65) Prior Publication Data

US 2020/0379876 A1  Dec. 3, 2020

(51) Int. Cl.
*G06F 11/36* (2006.01)

(52) U.S. Cl.
CPC ........ *G06F 11/364* (2013.01); *G06F 11/3664* (2013.01); *G06F 11/3688* (2013.01)

(58) Field of Classification Search
CPC . G06F 11/364; G06F 11/3664; G06F 11/3668
USPC .................................................. 717/124–129
See application file for complete search history.

(56) References Cited

U.S. PATENT DOCUMENTS

| 5,119,377 | A | * | 6/1992 | Cobb | G06F 11/366 714/38.11 |
| 6,071,317 | A | * | 6/2000 | Nagel | G06F 8/78 717/128 |
| 6,161,216 | A | * | 12/2000 | Shagam | G06F 11/3624 714/E11.209 |
| 6,202,199 | B1 | * | 3/2001 | Wygodny | G06F 11/3636 702/183 |
| 6,311,327 | B1 | * | 10/2001 | O'Brien | G06F 11/3466 714/35 |
| 6,530,076 | B1 | * | 3/2003 | Ryan | G06F 11/28 712/227 |
| 6,698,013 | B1 | * | 2/2004 | Bertero | G06F 8/71 717/101 |
| 6,836,882 | B2 | * | 12/2004 | Swoboda | G06F 11/3632 717/134 |

(Continued)

FOREIGN PATENT DOCUMENTS

| CN | 104050075 B | 5/2017 |
| CN | 107733863 A | 2/2018 |
| WO | 2018084808 A1 | 5/2018 |

OTHER PUBLICATIONS

Andrew, "General Test Result Checking with Log File Analysis", IEEE, pp. 634-648 (Year: 2003).*

(Continued)

*Primary Examiner* — Anil Khatri
(74) *Attorney, Agent, or Firm* — K&L Gates LLP

(57) ABSTRACT

Methods and systems for improved test execution and log file tracking are presented. In one embodiment, a method includes receiving a log file, which may be associated with a test. An original logging position of the log file may be stored and the test may be executed. Executing the test may cause logging information to be appended to the original logging position at the original logging position. An output file corresponding to the log file may be created and the original logging position within the log file may be located. A portion of the log file may then be copied to the output file starting at the original logging position.

20 Claims, 6 Drawing Sheets

(56) References Cited

U.S. PATENT DOCUMENTS

| | | | | |
|---|---|---|---|---|
| 7,120,901 | B2* | 10/2006 | Ferri | G06F 11/3636 717/128 |
| 7,433,804 | B2* | 10/2008 | Smith | G06F 11/36 702/186 |
| 7,490,269 | B2* | 2/2009 | Klamik | G06F 11/3688 714/47.2 |
| 7,606,814 | B2* | 10/2009 | Deily | G06F 16/9574 |
| 7,950,004 | B2* | 5/2011 | Vieira | G06F 11/3688 717/125 |
| 8,001,534 | B2* | 8/2011 | Daniel | G06F 11/3636 717/128 |
| 8,145,688 | B2* | 3/2012 | Reynolds | G06F 21/64 707/828 |
| 8,347,269 | B2* | 1/2013 | Lazzaro | G06F 11/3664 717/128 |
| 8,813,038 | B2* | 8/2014 | Erickson | G06F 11/3636 717/124 |
| 8,839,203 | B2* | 9/2014 | Opstad | G06F 11/3676 717/128 |
| 9,015,668 | B1 | 4/2015 | Michelsen | G06F 11/3688 717/124 |
| 9,734,005 | B2* | 8/2017 | Ruan | G06F 11/2257 |
| 10,387,295 | B1* | 8/2019 | Kesarwani | G06F 11/3664 |
| 10,761,963 | B2* | 9/2020 | Huang | G06F 11/3466 |
| 2011/0179160 | A1 | 7/2011 | Liu et al. | |
| 2016/0292166 | A1 | 10/2016 | Russell | |

OTHER PUBLICATIONS

Tu et al, "A Method of Log File Analysis for Test Oracle", IEEE, pp. 351-354 (Year: 2009).*

Clune et al, "Software Testing and Verification in Climate Model Development", IEEE, pp. 49-55 (Year: 2011).*

Kapinski et al, "Simulation-Based Approaches for Verification of Embedded Control Systems", IEEE, pp. 45-64 (Year: 2016).*

Andrews et al, "General Test Result Checking with Log File Analysis", IEEE, pp. 634-658 (Year: 2003).*

Nagappan et al, "Abstracting Log Lines to Log Event Types for Mining Software System Logs", IEEE, pp. 114-117 (Year: 2010).*

Chen, A"n Empirical Study on Leveraging Logs for Debugging Production Failures", IEEE, pp. 126-128 (Year: 2019).*

Min Du et al.; "DeepLog: Anomaly Detection and Diagnosis from System Logs through Deep Learning"; School of Computing, University of Utah; Oct. 30-Nov. 3, 2017; (14 pages).

"Best Log Management Tools: 51 Useful Tools for Log Management, Monitoring, Analytics, and More"; Stackify; May 26, 2017; (61 pages).

* cited by examiner

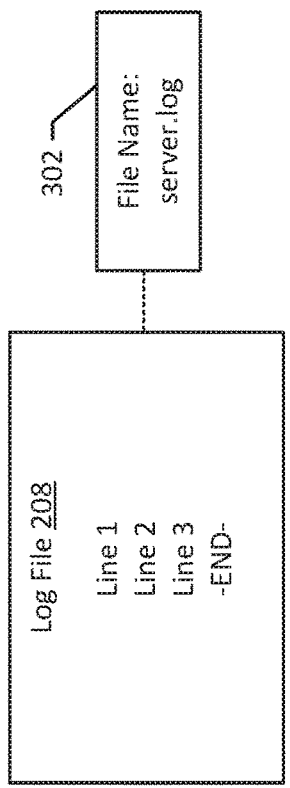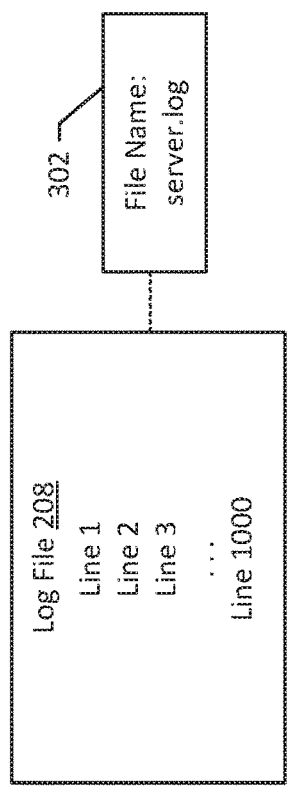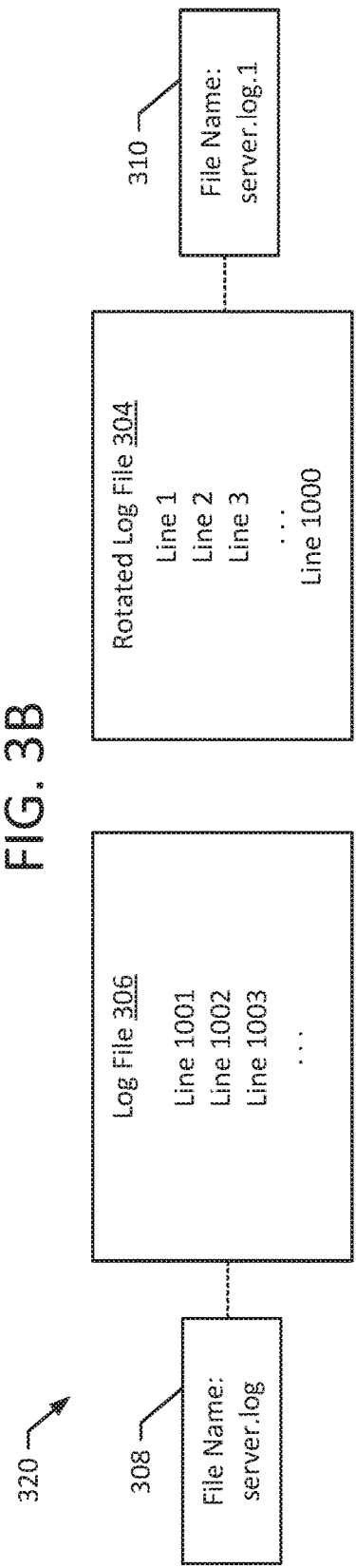

SOFTWARE DEBUGGING SYSTEM WITH IMPROVED TEST EXECUTION AND LOG FILE TRACKING

BACKGROUND

When developing a software application, developers may prepare and execute one or more tests on newly-developed code before deployment for debugging. These tests may include one or more system, integration, and/or acceptance tests that validate the code's correct functioning. Such tests may operate in a testing environment and may write information to log files concerning the results of the test executed on the newly-developed code.

SUMMARY

The present disclosure presents new and innovative solutions to software debugging test execution and log file management. In one embodiment, a method comprises receiving a log file, which is associated with a test, storing an original logging position of the log file, and executing the test in a testing environment. Executing the test may cause logging information to be appended to the log file at the original logging position. The method may further comprise creating an output file corresponding to the log file, locating the original logging position within the log file, and copying, starting from the original logging position, at least a portion of the log file to the output file.

In another embodiment, a system is provided comprising a processor and a memory. The memory stores instructions which, when executed by the processor, cause the processor to receive a log file, which is associated with a test, store an original logging position of the log file, and execute the test in a testing environment. Executing the test may cause logging information to be appended to the log file at the original logging position. The memory may store further instructions which, when executed by the processor, cause the processor to create an output file corresponding to the log file, locate the original logging position within the log file, and copy, starting from the original logging position, at least a portion of the log file to the output file.

In a further embodiment, a non-transitory, computer-readable medium is provided storing instructions which, when executed by a processor, cause the processor to receive a log file, which is associated with a test, store an original logging position of the log file, and execute the test in a testing environment. Executing the test may cause logging information to be appended to the log file at the original logging position. The non-transitory, computer-readable medium may store further instructions which, when executed by the processor, cause the processor to create an output file corresponding to the log file, locate the original logging position within the log file, and copy, starting from the original logging position, at least a portion of the log file to the output file.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 3A-3C illustrate log file states according to exemplary embodiments of the present disclosure.

DETAILED DESCRIPTION OF EXAMPLE EMBODIMENTS

When multiple tests execute at the same time, information written to log files from each test may be interspersed and shuffled together within the log file. In particular, the tests may be executed by multiple computing systems, which each may be executing different tests while causing logging information to the same log file. Furthermore, the same test may cause logging information to multiple log files (e.g., a separate log file for each of a plurality of functional systems of a software program). Debugging systems tasked with reviewing these log files to address one or more errors identified during the tests may fail to find all of the relevant log file entries from a given test because they are separated from one another within the log file or files by entries from other tests. Log files aggregated in this way may therefore significantly impede debugging of software development errors.

Additionally, the multiple computing systems may use multiple date and/or time conventions, making timestamps unreliable indicators of proper log entry sequencing and reducing the ability for the software debugging tools to determine the proper sequence of log file entries. On top of these issues, when log files are full (e.g., exceed a certain number of entries and/or file size), subsequent log entries may be added to another log file. Such systems can disperse relevant log entries across multiple files, further complicating debugging of software testing errors.

One solution to this problem is to identify the portions of a log file corresponding with previous test executions before executing a test. Then the test may be executed, which may cause additional log file entries to be written to the log file. Once execution is complete, the log file may be analyzed to identify the log file entries that were written to the log file during execution of the test. For example, prior to execution, the end of the log file may be identified such that any entries written to subsequent lines of the log file can be determined to originate from execution of the test. After completing execution of the test, the subsequent log file entries may then be copied to a separate output file for debugging.

In certain instances, this output file may be stored in an entirely separate directory such that the entire process can run without interfering with ordinary program testing procedures. For example, regular testing procedures may proceed until it is determined that a program failed a test. The above solution may then be performed in order to generate separate output files containing the log file entries corresponding to each test. Then debugging may proceed using the output file corresponding to a failed test, where the output file only contains log file entries corresponding to that test.

Figure 1:
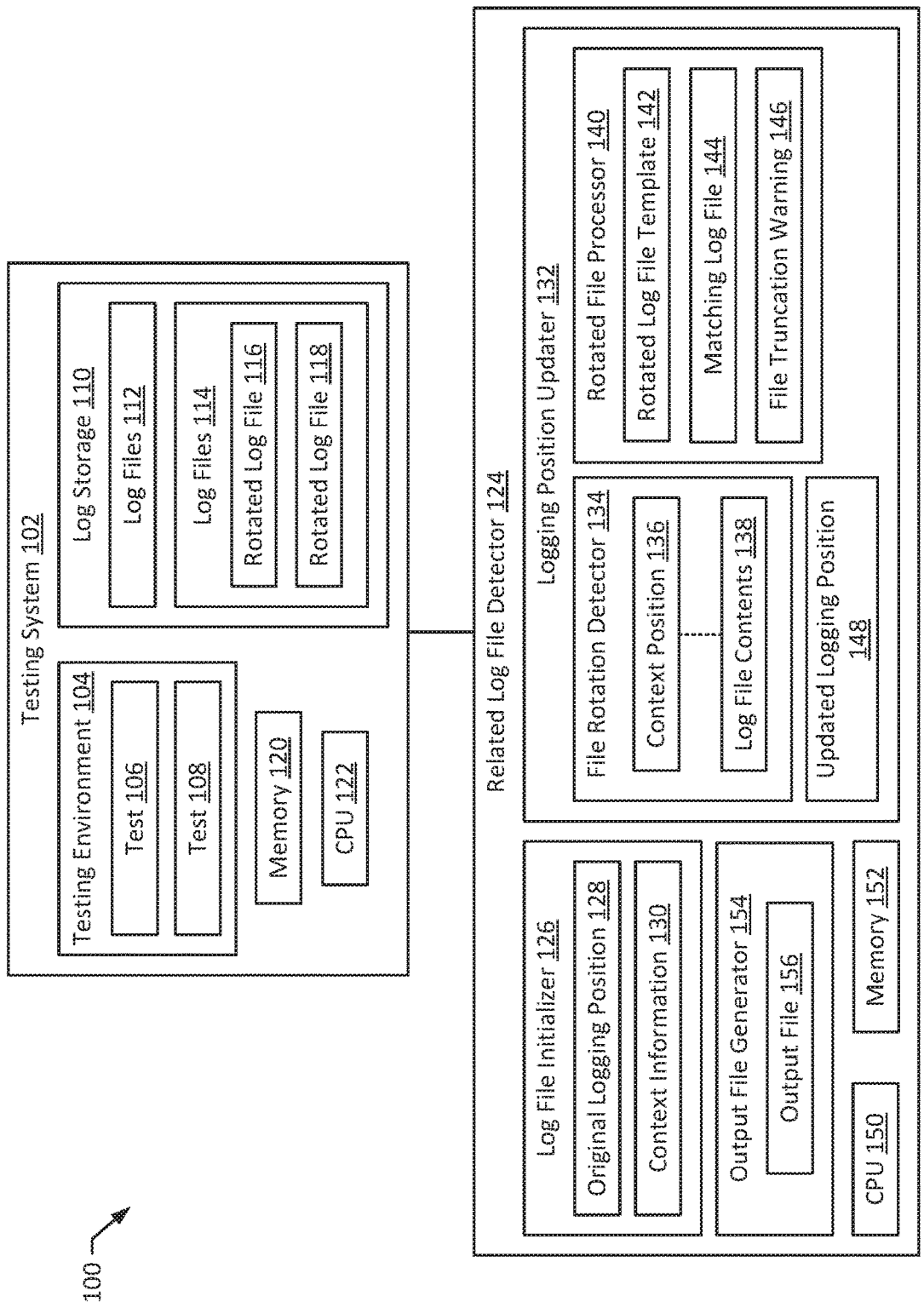
FIG. 1 illustrates a system according to an exemplary embodiment of the present disclosure.

FIG. 1 illustrates a system 100 according to an exemplary embodiment of the present disclosure. The system 100 may be configured to execute tests and to separately gather log files relating to each test. The system 100 includes a testing system 102, which may be configured to execute tests and to cause log files to be generated and updated based on the results of those tests, and a related log file detector 124, which may be configured to gather log files relating to individual tests.

The testing system 102 includes a testing environment 104 executing tests 106, 108, log storage 110 storing log files 112, 114, a CPU 122, and a memory 120. The testing system 102 may be configured to execute one or more tests 106, 108 and the testing environment 104. For example, the tests 106, 108 may be configured to validate one or more networking, file management, security, and/or functionality requirements of the software program. In particular, a cloud system test may be created to establish a test cloud for a program, run networking tests on the program, run functionality tests on the program, and perform validation tests on the program prior to deployment. Updates to existing software programs and/or newly-developed software programs may be required to pass the tests 106, 108 prior to deployment. The testing system 104 may interface with one or more operational systems of a broader computing deployment. For example, tests 106, 108 testing networking features of a program may interface with a networking system and/or a cloud system of the computing deployment. Similarly, tests 106, 108 testing build performance of software program may interface with a build and compilation system of the computing deployment.

While executing the tests 106, 108, the testing environment 104 may cause log entries generated by the tests 106, 108 to be written to the log files 112, 114 stored in the log storage 110. For example, each of the computing systems executing the steps 106, 108 may maintain its own log files 112, 114 and may cause log entries to be written to the corresponding log file 112, 114. In certain implementations, the testing environment 104 may execute more than one test 106, 108 at the same time, and the executing computing systems may therefore cause log entries corresponding to either test 106, 108 to be written at the same or similar times. For simplicity, FIG. 1 only depicts two tests 106, 108. In practice, implementations of the testing environment 104 may have many tests executing simultaneously across multiple computing systems. In such instances, log entries relating to each test 106, 108 may be mixed up and/or spread out throughout the log files 112, 114. For example, the cloud system may be implemented by a plurality of computing devices distributed in different time zones. These computing devices may utilize separate timestamp formatting conventions and some of the computing platforms may write timestamps in a local time zone, depending on the configuration of the test 106, 108, causing the log file 112, 114 associated with the cloud system to include log entries with different time stamps. In addition or alternatively, computing devices in the same time zone may differ slightly in local time (e.g., via a few seconds or milliseconds) due to typical timekeeping errors for computing devices, which could also put log entries associated with the execution of the same test 106, 108 out of order. In either instance, restoring the proper sequencing for debugging may be exceedingly complex and difficult.

Additionally, in certain instances, the log files 114 may include one or more rotated log files 116, 118, as will be explained in greater detail below. For example, where a log file 114 exceeds a certain size or length threshold, the log storage 110 may rotate the log file (e.g., to a different filename) and may generate a new log file with the previous filename for use by the testing environment 104 and corresponding computing systems.

The related log file detector 124 includes a log file initializer 126 storing original logging position 128 and context information 130, an output file generator 154 storing an output file 156, and logging position updater 132, a CPU 150, and a memory 152. The logging position updater 132 includes a file rotation detector 134 storing a context position 136 associated with log file contents 138 and a rotated file processor 140 storing a rotated log file template 142, a matching log file 144, and a file truncation warning 146. Logging position updater 132 further includes an updated logging position 148. The related log file detector 124 may be configured to generate an output file 156 including only the log file entries from one or more log files 112, 114 corresponding to a respective single test 106, 108. For example, while executing the test 108, an error in a corresponding software program may be identified, so the output file generator 154 and the related log file detector 124 may then operate to generate an output file 156 with the log file entries corresponding to the test 108 from one or more log files 112, 114. In another example, errors may occur while executing both tests 106, 108, in which case a separate output file 156 may be generated for each test 106, 108.

The log file initializer 126 may be configured to identify an original logging position 128 of log files 112, 114 prior to the execution of a test 106, 108. The original logging position 128 may represent the end of the log file 112, 114 prior to executing the test 106, 108. For example, if multiple tests 106, 108 are run in sequence, one at a time, the original logging position 128 may identify where the portion of a log file 112, 114 corresponding to a first test 106 ends before execution of a second test 108. The log file initializer 128 may also store context information 130. The context information 130 may identify information at the end log file 112, 114. For example, the context information 130 may store the three lines preceding the original logging position 128, although other embodiments are possible (e.g., 1 line, 5 lines). In certain implementations (e.g., where the log file 112, 114 is empty), no context information 130 may be stored.

The logging position updated 132 may be configured to determine an updated logging position 148 in a log file 112, 114 after execution of a test 106, 108. The updated logging position 148 indicates the location of the logging entry identified by the original logging position 128 after execution of the test 106, 108, as indicated below.

To do this, the file rotation detector 134 may be configured to determine whether the log files 112 114 have been rotated to generate one or more rotated log files 116, 118. To do this, the file rotation detector 134 may calculate a context position 136 of the context information 130 that indicates a location of the beginning of the context information 130 in the log file 112, 114. The file rotation detector 134 may copy the log file contents 138 from the log file 112, 114 at the context position 136 to determine whether file rotation has occurred.

If file rotation is detected, the rotated file processor 140 may be configured to identify rotated log files 116, 118 associated with the log file 114. For example, the rotated file processor 140 may generate a rotated log file template 142 based on a file name of the log file 114. The rotated file processor 140 may identify one or more matching log files 144 with names matching or similar to the rotated log file template 142 located in the same file directory as the log file 114. These matching log files 144 may represent rotated log files 116, 118 generated during the test 106, 108 and corresponding to the log file 114. The rotated file processor 140 may then search for the context information 130 within the matching log files 144. If the context information 130 is not found, then the rotated log file 114 storing the log file entries corresponding to the original logging position 128 of the log file 114 may be determined to be deleted. The rotated file processor 140 may therefore generate a file truncation warning 146, which may be presented to a user to indicate that the log file 114 has been truncated and that all or part of the relevant log entries from the test 106, 108 may no longer be available.

The output file generator 154 may be configured to generate the output file 156 containing the log entries corresponding to the test 106, 108 executed by the testing environment. This output file 156 may then be used to debug and fix errors identified during execution of the test 106, 108.

The CPUs 122, 150 and the memories 120, 152 may implement one or more aspects of the testing system 102 and the related log file detector 124, such as the testing environment 104, the log storage 110, the log file initializer 126, the output file generator 154, and the logging position updater 132. For example, the memories 120, 152 may store instructions which, when executed by the CPUs 122, 150, may perform one or more of the operational features of the testing system 102 and/or the related log file detector 124. If file rotation has not occurred during execution of the test 106, 108, then the updated logging position 148 may be the same as the original logging position 128.

Figure 2:
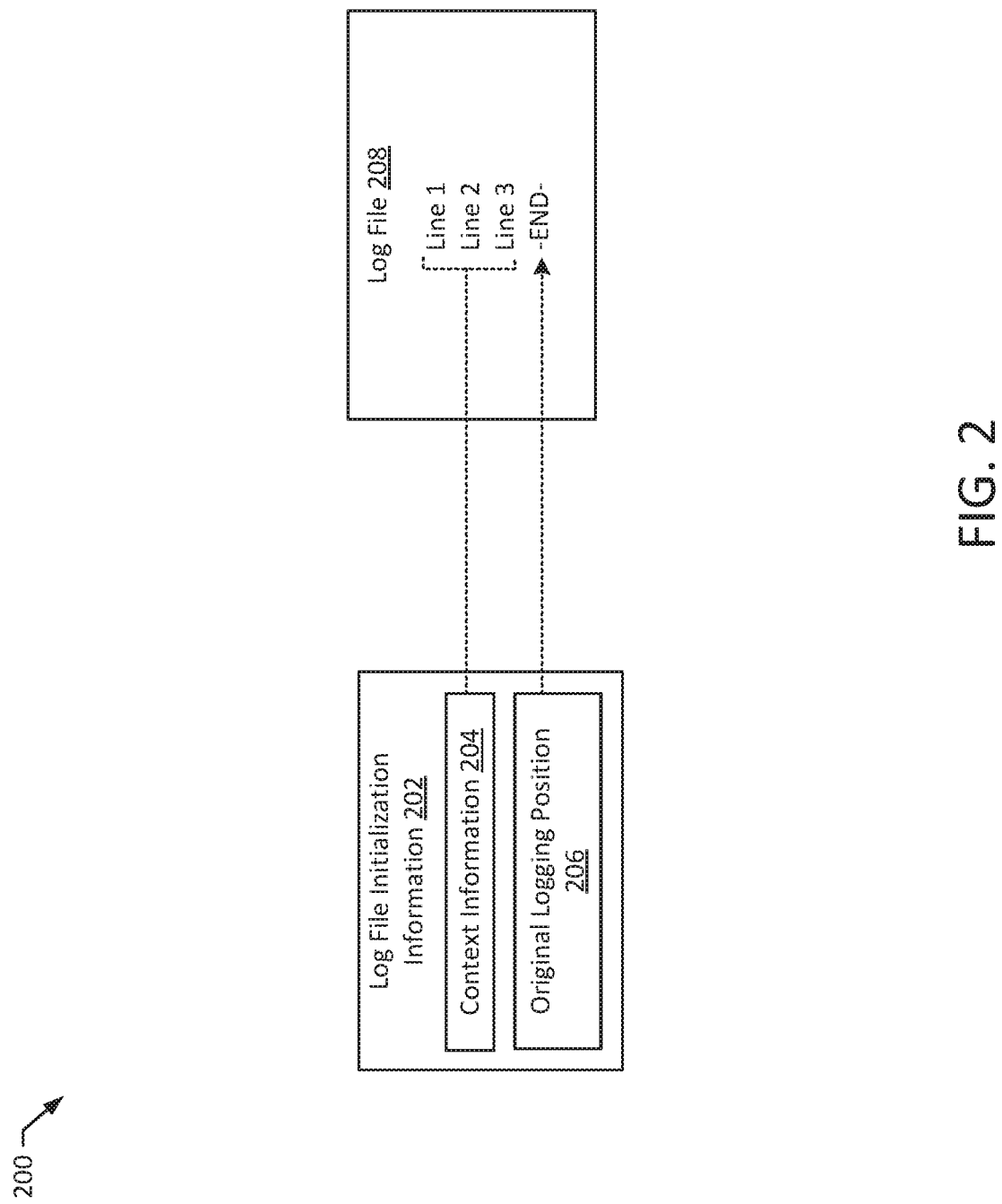
FIG. 2 illustrates a log file initialization state according to an exemplary embodiment of the present disclosure.

FIG. 2 illustrates a log file initialization state 200 according to an exemplary embodiment of the present disclosure. The log file initialization state 200 may depict a conceptual representation of the information stored by the log file initializer 126 prior to executing the test 106, 108. For example, log file initialization state 200 may indicate information stored by the log file initializer 126 regarding the log file 208, which may itself be an embodiment of the log files 112, 114. In particular, the log file initialization information 202 includes context information 204, which may correspond to the context information 130 and an original logging position 206, which may correspond to the original logging position 128.

The log file 208 may correspond to one of the log files 112, 114 prior to executing a test 106, 108. As depicted, the original logging position 206 stores the location the end of the log file 208. The original logging position 206 may be stored as one or more of the line numbers at the end of the log file 208 and the size of the log file 208 (e.g., a size in bytes). In such configurations, log entries after the original logging position 206 may therefore be determined to originate from execution of the test 106, 108.

The context information 204 corresponds to the three lines preceding the original logging position 206. The context information 204 may be stored as a copy of the actual lines themselves. As explained above, in certain implementations, the context information 204 may include more or fewer lines of the log file 208. In other implementations, the context information 204 may not be stored if the log file 208 is empty.

Below is an example of lines 1 to 3 of the log file 208 before a test 106, 108 is executed:

1: Apr 23 23:04:23.867377 ubuntu-bionic-limestone-regionone-0005538801 devstack@n-api.service[19263]: DEBUG nova.policy [None req-760948a1-72dc-410c-8886-241198acfc94 tempest-ServerGroupTestJSON-250460445 tempest-ServerGroupTestJSON-250460445] Policy check for os_compute_api:os-extended-server-attributes failed with credentials {'service_roles': [ ], 'user_id': u'bb6d53830ea6402b-a86f2a6e0975dd75', 'roles': [u'member', u'reader'], 'system_scope': None, 'service_project_id': None, 'service_user_id': None, 'service_user_domain_id': None, 'service_project_domain_id': None, 'is_admin_project': True, 'is_admin': False, 'user_domain_id': u'default', 'project_id': u'01301036dfd04197870d25-1d64461e38', 'domain_id': None, 'project_domain_id': u'default'} {{(pid= 19265) authorize/opt/stack/nova/nova/policy.py:167}}
 2: Apr 23 23:04:23.876003 ubuntu-bionic-limestone-regionone-0005538801 devstack@n-api.service[19263]: INFO nova.api.openstack.requestlog [None req-760948a1-72dc-410c-8886-241198acfc94 tempest-ServerGroupTestJSON-250460445 tempest-ServerGroupTestJSON-250460445] 10.4.70.91 "GET/compute/v2.1/servers/a0426b3f-aee5-4253-acf8-d262f5fa5d24" status: 200 len: 1310 microversion: 2.1 time: 0.447378
 3: Apr 23 23:04:23.876410 ubuntu-bionic-limestone-regionone-0005538801 devstack@n-api.service[19263]: [pid: 19265|app: 0|req: 2740/5437] 10.4.70.91 ( ){64 vars in 1349 bytes} [Tue Apr 23 23:04:23 2019] GET/compute/v2.1/servers/a0426b3f-aee5-4253-acf8-d262f5fa5d24=> generated 1310 bytes in 449 msecs (HTTP/1.1 200) 9 headers in 358 bytes (2 switches on core 0)

Each of the lines 1 to 3 may correspond to a log file entry of the log file 208. For example, prior to executing the test 108, the testing environment 104 may have executed the test 106. Lines 1 to 3 may represent the last three lines of the log file 208 after execution of the test 106 has completed. After executing the test 108, the log file 208 may include additional lines. For example, an example of lines 1 to 7 is depicted below:

1: Apr 23 23:04:23.867377 ubuntu-bionic-limestone-regionone-0005538801 devstack@n-api.service[19263]: DEBUG nova.policy [None req-760948a1-72dc-410c-8886-241198acfc94 tempest-ServerGroupTestJSON-250460445 tempest-ServerGroupTestJSON-250460445] Policy check for os_compute_api:os-extended-server-attributes failed with credentials {'service_roles': [ ], 'user_id': u'bb6d53830ea6402b-a86f2a6e0975dd75', 'roles': [u'member', u'reader'], 'system_scope': None, 'service_project_id': None, 'service_user_id': None, 'service_user_domain_id': None, 'service_project_domain_id': None, 'is_admin_project': True, 'is_admin': False, 'user_domain_id': u'default', 'project_id': u'01301036dfd04197870d25-1d64461e38', 'domain_id': None, 'project_domain_id': u'default'} {{(pid=19265) authorize/opt/stack/nova/nova/policy.py:167}}
 2: Apr 23 23:04:23.876003 ubuntu-bionic-limestone-regionone-0005538801 devstack@n-api.service[19263]: INFO nova.api.openstack.requestlog [None req-760948a1-72dc-410c-8886-241198acfc94 tempest-ServerGroupTestJSON-250460445 tempest-ServerGroupTestJSON-250460445] 10.4.70.91 "GET/compute/v2.1/servers/a0426b3f-aee5-4253-acf8-d262f5fa5d24" status: 200 len: 1310 microversion: 2.1 time: 0.447378
 3: Apr 23 23:04:23.876410 ubuntu-bionic-limestone-regionone-0005538801 devstack@n-api.service[19263]: [pid: 19265|app: 0|req: 2740/5437] 10.4.70.91 ( ) {64 vars in 1349 bytes} [Tue Apr 23 23:04:23 2019] GET/compute/v2.1/servers/a0426b3f-aee5-4253-acf8- d262f5fa5d24=> generated 1310 bytes in 449 msecs (HTTP/1.1 200) 9 headers in 358 bytes (2 switches on core 0)

4: Apr 23 23:04:23.880680 ubuntu-bionic-limestone-regionone-0005538801 devstack@n-api.service[19263]: DEBUG nova.api.openstack.wsgi [None req-37790065-c529-4567-9532-302280efa61b tempest-ServerAddressesTestJSON-904129595 tempest-ServerAddressesTestJSON-904129595] Calling method '<bound method ServersController.show of <nova.api.openstack.compute.servers.ServersController object at 0x7f47b19e6650>>' {{(pid=19265)_process_stack/opt/stack/nova/nova/api/openstack/wsgi.py:523}}

5: Apr 23 23:04:23.882225 ubuntu-bionic-limestone-regionone-0005538801 devstack@n-api.service[19263]: DEBUG nova.compute.api [None req-37790065-c529-4567-9532-302280efa61b tempest-ServerAddressesTestJSON-904129595 tempest-ServerAddressesTestJSON-904129595] [instance: ece73fa2-f6c3-434a-8400-5541405f1819] Fetching instance by UUID {{(pid=19265) get/opt/stack/nova/nova/compute/api.py:2587}}

6: Apr 23 23:04:23.889499 ubuntu-bionic-limestone-regionone-0005538801 devstack@n-api.service[19263]: DEBUG oslo_concurrency.lockutils [None req-37790065-c529-4567-9532-302280efa61b tempest-ServerAddressesTestJSON-904129595 tempest-ServerAddressesTestJSON-904129595] Lock "d197f3d5-283f-4767-9aa1-7fa1db6c648c" acquired by "nova.context.get_or_set_cached_cell_and_set_connections" :: waited 0.000s {{(pid=19265) inner/usr/local/lib/python2.7/dist-packages/oslo_concurrency/lockutils.py: 327}}

7: Apr 23 23:04:23.889499 ubuntu-bionic-limestone-regionone-0005538801 devstack@n-api.service[19263]: DEBUG oslo_concurrency.lockutils [None req-37790065-c529-4567-9532-302280efa61b tempest-ServerAddressesTestJSON-904129595 tempest-ServerAddressesTestJSON-904129595] Lock "d197f3d5-283f-4767-9aa1-7fa1db6c648c" released by "nova.context.get_or_set_cached_cell_and_set_connections" :: held 0.001s {{(pid=19265) inner/usr/local/lib/python2.7/dist-packages/oslo_concurrency/lockutils.py:339}}

In this example, lines 1 to 3 are the same as before executing the test 108, but lines 4 to 7 are new and may correspond to the first four log entries in the log file 208 generated during execution of the test 108. These lines may continue, such as up to line 1000 as depicted in FIG. 3B, as discussed below.

FIGS. 3A-3C illustrate log file states 300, 310, 320 according to exemplary embodiments of the present disclosure. The log file states 300, 310, 320 may depict the state of the log file 208 during execution of a test 106, 108. The state 300 depicts the log file 208 prior to executing the test 106, 108. For example, similar to FIG. 2, the state 300 may depict the log file 208 after the execution of a first test 106 and before executing a second 108. In the state 300, the log file 208 includes lines 1 to 3 before ending. These lines 1 to 3 may represent the last three lines of a previously to executed first test 106 and/or log entries corresponding to initialization procedures, such as initialization of the computing systems (e.g., networking systems, cloud system, build systems) responsible for executing test 106, 108.

The state 310 depicts the log file 208 with additional lines up to line 1,000. The state 310 may occur during execution of a test 108. For example, lines 4 to 1,000 may be generated by the testing environment 104 and/or the computing system executed the test. In certain implementations, the size of individual log files 208 may be limited (e.g., by the testing system 102 and/or the computing systems executing the tests 106, 108. For example, the size of log files may be limited to a certain number of lines (e.g., 1,000 lines, 10,000 lines, 100,000 lines) or to a certain file size (e.g., 500 kB, 1 MB, 5 MB). In the depicted example, the size of the log file 208 is limited to 1,000 lines. However, if execution of the test 108 has not completed, the log file 208 may be rotated so that a new, rotated log file can be created for the rest of the execution of the test 108.

The state 320 depicts a log file 306 and a rotated log file 304 after the log file 208 is rotated. As can be seen, the rotated log file 304 includes the lines 1 to 1,000 from the log file 208. However, the original file name 302 of the log file 208 has changed from "server.log" to the file name 310 of the rotated log file 304 of "server.log.1." A new log file 306 has also been created with the file name 308 of "server.log," indicating that the log file 306 is the new log file for subsequent log entries. In light of this, the log file 306 includes subsequent log entries, including line 1,001 to 1,003. In this way, the rotated log file 304 is limited to the 1,000 line size limit, but the new log file 306 is able to continue receiving log entries during execution of the test 108.

If execution of the test 108 proceeds such that the log file 306 also reaches the 1,000 line limit, the log file 306 may also be rotated. In this operation, the file name 308 of the log file 306 may change from "server.log" to "server.log.1" and the file name 310 of the rotated log file 304 may change from "server.log.1" to "server.log.2." The relative sequence of the rotated log files 304 is therefore maintained, with the earliest file having the largest numeric indicator and the most recent log file having no numeric indicator, because the earliest log file is not rotated. In certain implementations, the numbering conventions may differ. For example, instead of changing the file name 310 of the rotated log file 304 to "server.log.2," the file name 308 of the log file 306 may be changed to "server.log.2" and the file name 310 of the rotated log file 304 may stay as "server.log.1." In such a system, the earliest rotated log file 304 would have the smallest numeric indicator, the latest rotated log file would have the largest numeric indicator, and the most recent log file would have no numeric indicator because it was not rotated.

Figure 4:
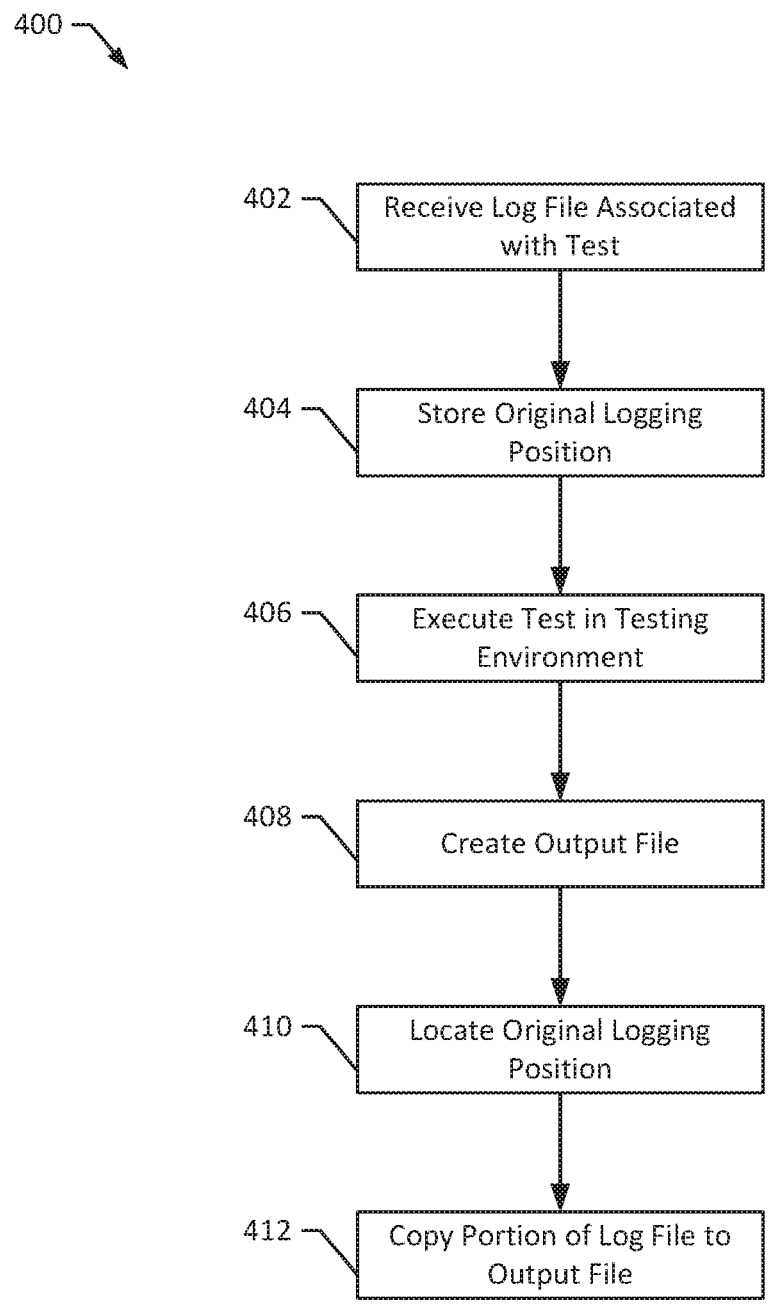
FIG. 4 illustrates a method according to an exemplary embodiment of the present disclosure.

FIG. 4 illustrates a method 400 according to an exemplary embodiment of the present disclosure. The method 400 may be performed to copy log entries from log files 112, 114, 208, 306 and rotated log files 116, 118 generated during execution of an individual test 106, 108. In particular, the method 400 may be performed by the related log file detector 124 to implement the functions of one or more of the log file initializer 126, the logging position updater 132, and the output file generator 154. The method 400 may be implemented on a computer system, such as the system 100. For example, the method 400 may be implemented by the testing system 102 and/or the related log file detector 124. The method 400 may also be implemented by a set of instructions stored on a computer readable medium that, when executed by a processor, cause the computer system to perform the method. For example, all or part of the method 400 may be implemented by the CPUs 122, 150 and the memories 120, 152. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional. In particular, if the related log file detector 124 has multiple tests 106, 108 to process and identify log files 112, 114, 208, 306 for, the method 400 may be repeated for each test 106. In such instances, the tests 106, 108 may be executed in a serialized manner so that the testing environment 104 executes only one test at a time 106, 108. For example, the testing environment may finish executing a first test 106 before beginning execution of a second test 108.

The method 400 begins with receiving a log file associated with a test (block 402). For example, the related log file detector 124 may receive a log file 112, 114, 208, 306 from the testing system 102, such as from the log storage 110. The log file 112, 114, 208, 306 may be generated by a computing system (e.g., networking system, cloud system, build system) responsible for executing at least a portion of the test 106, 108. In certain implementations, the log file 112, 114, 208, 306 may include log entries from prior test executions, such as the lines 1 to 3 of the log file 208.

The log file initializer may then store an original logging position of the log file (block 404). For example, the log file initializer 126 may store an original logging position 128, 206 of the log file 112, 114, 208, 306 received from the log storage 110. The original logging position 128, 206 may indicate an end of the log file 112, 114, 208, 306. For example, the original logging position 128, 206 may store an indication of the last line (i.e., log entry) of the log file 112, 114, 208, 306 and/or a size of the log file 112, 114, 208, 306. In particular, as with the original logging position 206 may identify the end of the log file 208.

The testing system may then execute the test in the testing environment (block 406). For example, the testing system 102 may execute the test 106, 108 using one or more computing systems, as explained above. In executing the tests, the computing systems may cause log entries to be written to corresponding log files 112, 114, 208, 306. For example, the log file 112, 114, 208, 306 may correspond to a cloud system responsible for running portions of the test 106, 108 corresponding to cloud functionality. Accordingly, during the test, the cloud system may cause log entries relating to such portions of the test 106, 108 to be written to a corresponding log file 112, 114, 208, 306. As explained above, the cloud system may be implemented by multiple, physically separated computing devices which may differ in time zone, timestamp convention, and may differ slightly in local timing accuracy, which can complicate the efforts to determine the proper sequence of log entries in the log file 112, 114, 208, 306. In implementations where the test 106, 108 is performed by multiple computing systems, the related log file detector 124 may process multiple log files 112, 114, 208, 306, wherein each log file 112, 114, 208, 306 corresponds to one or more of the computing systems. In such implementations, the log file initializer 126 may store an original logging position 128, 206 for each log file 112, 114, 208, 306.

The output file generator may then create an output file (block 408). For example, the output file generator 154 may create the output file 156. In certain implementations, the output file 156 may be created with a file name similar to a name of the test 106, 108 being executed. In certain embodiments, the output file 156 may be created in a different file directory than the log file 112, 114, 208, 306 (e.g., a debugging directory). In other embodiments, the output file 156 may be created in the same file directory as the log file 112, 114, 208, 306. When initially created, the output file 156 may be an empty file in the same format as the log file 112, 114, 208, 306 (e.g., in a ".log," ".txt," or ".bin" format). In other implementations, the output file generator 154 may add information to the output file 156 upon creation, such as information regarding the corresponding test and/or computing system.

The logging position updater may then locate the original logging position (block 410). For example, the logging position updater 132 may locate the original logging position 128 after the test 106, 108 is executed. As explained in connection with FIGS. 2 and 3A-3C, during the test, the computing systems may cause log entries to be written to the log file 112, 114, 208, 306. In instances where no log file rotation occurs, the original logging position 128 may not change during execution of the test 106, 108. However, when execution of the test 106, 108 results in log file rotation, the log entry initially at the original logging position 128 may have moved to a location within a rotated log file 116, 118, 304 with a different file name 310. Accordingly, the file rotation detector 134 may determine whether file rotation has occurred during execution of the test 106, 108 and, if so, the rotated file processor 140 may locate an updated logging position 148 within the rotated log files 116, 118, 304 that corresponds to the log entry initially at the original logging position 128.

The output file generator may then copy at least a portion of the log file to the output file (block 412). For example, the output file generator 154 may copy a portion of the log file 112, 114, 208, 306 to the output file 156. In particular, the output file generator 154 may copy the portion of the log file 112, 114, 208, 306 starting at the original logging position through the end of the log file 112, 114, 208, 306. In this way, the output file 156 will include all of the log file entries generated during execution of the test 106, 108. In instances where log file rotation has occurred, the output file generator 154 may copy the portion of the rotated log file 116, 118, 304 starting from the updated logging position 148 to the end of the rotated log file 116, 118, 304. The output file generator 154 may proceed to the next rotated log file 116, 118, 304 or log file 112, 114, 208, 306 in the sequence of rotated log files and may copy the contents of the subsequent file or files into the output file 156 as well. For example, after copying lines 4 to 1,000 in the rotated log file 304 to the output file 156, the output file generator 154 may proceed with beginning to copy line 1,001 of the log file 306. In certain instances, the output file generator 154 may apply log file rotation to the output file 156 to constrain the size of the output files 156 similar to the log files 112, 114, 208, 306.

Figure 5:
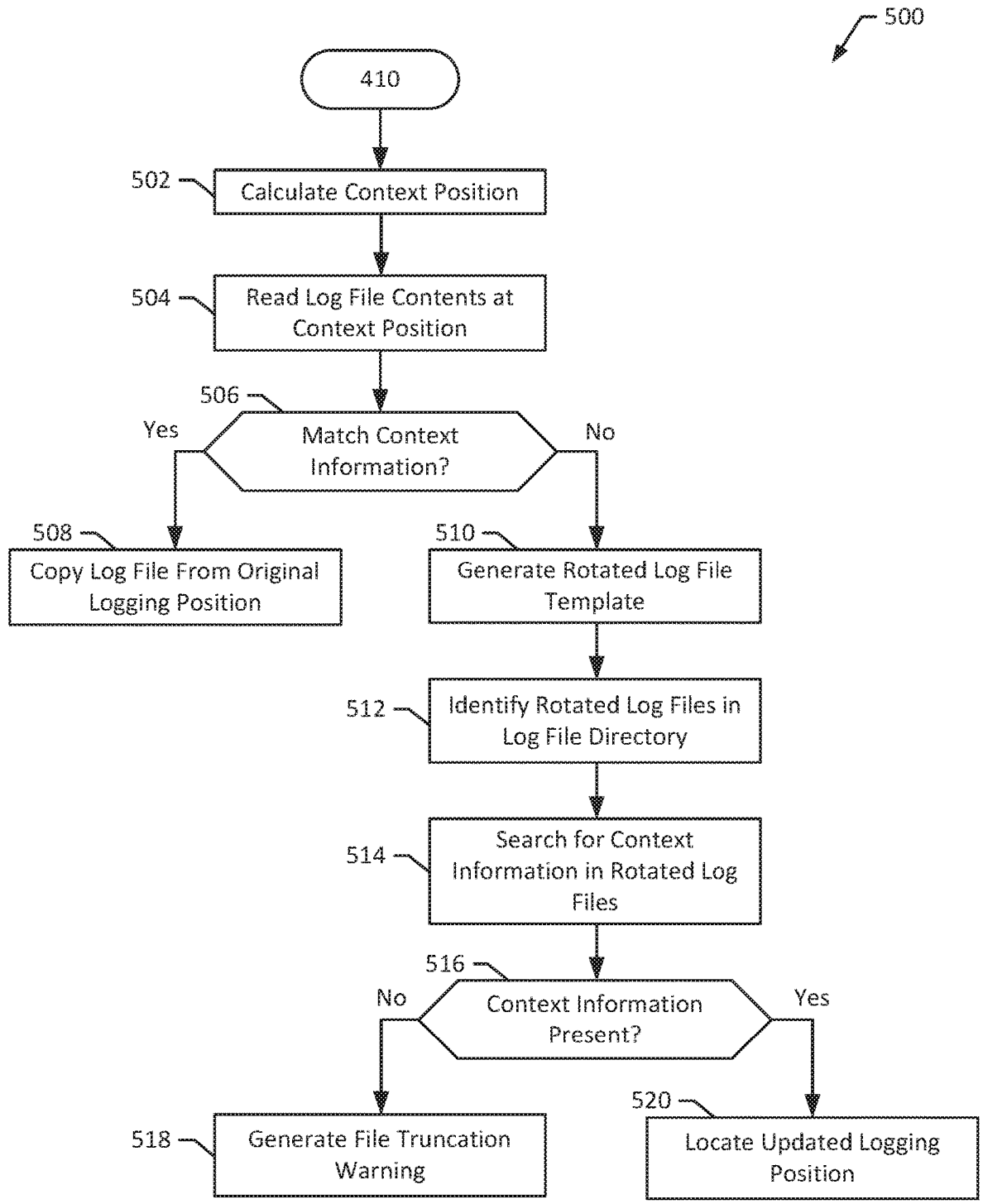
FIG. 5 illustrates a method according to an exemplary embodiment of the present disclosure.

FIG. 5 illustrates a method 500 according to an exemplary embodiment of the present disclosure. The method 500 may be performed to determine whether log file rotation has occurred during execution of a test 106, 108 and, if so, to locate an updated logging position 148 within a rotated log file 116, 118, 304. For example, the method 500 may be performed while implementing the method 410. The method 500 may be implemented on a computer system, such as the system 100. For example, the method 500 may be performed by the logging position updater 132, including by the file rotation detector 134 and the rotated file processor 140. The method 500 may also be implemented by a set of instructions stored on a computer readable medium that, when executed by a processor, cause the computer system to perform the method. For example, all or part of the method 500 may be implemented by the CPUs 122, 150 and the memories 120, 152. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 begins with the file rotation detector calculating a context position (block 502). For example, the file rotation detector 134 may calculate the context position 136. In particular, the context position 136 may be calculated by subtracting the number of lines in the context information 130, 204 from the original logging position 128. For example, in FIG. 2, the context position 136 may be calculated by subtracting three lines for the three lines stored in the context information 130, 204 from the original logging position 206 identifying the end of the log file 208. In another example, the context position 136 may be calculated by subtracting a certain number of characters (e.g., 100 or 1,000 characters) from the original logging position 206, depending on how the context information 130, 204 is determined and stored.

The file rotation detector may then copy the log file contents at the context position from the log file (block 504). For example, the file rotation detector 134 may copy the log file contents 138 at the context position 136. In particular, the file rotation detector may copy the log file contents 138 from a log file 112, 114, 208, 306 (e.g., a log file 112, 114, 208, 306) with the same file name 302 and located in the same file directory as the log file 112, 114, 208, 306 received at block 402.

The file rotation detector may then compare the log file contents to the context information (block 506). For example, the file rotation detector 134 may compare the log file contents 138 to the context information 130 stored by the log file initializer. If the context information matches the log file contents, the output file generator may copy the contents from the log file from the original logging position (block 508). For example, if the context information 130, 204 matches, the output file generator 154 may copy the contents from the log file 112, 114, 208, 306 starting at the original logging position 508. In such instances, the file rotation detector 134 may determine that file rotation has not occurred because the context information 130, 204 from the file with the same file name 302 matches, indicating that the original log file 112, 114, 208, 306 has not rotated and changed file names 310 during execution of the test 106, 108. Therefore, logging position updater 132 may determine that the contents of the log file 112, 114, 208, 306 can be accurately copied from the original logging position 128 in the original log file 112, 114, 208, 306. For example, if execution of the test ends in the log file state 310, file rotation has not occurred, so copying lines 4 to 1,000 (i.e., after the original position 206 indicated in FIG. 2) is accurate.

If, however, the context information does not match the log file contents, the rotated file processor may generate a rotated file template (block 510). For example, the rotated file processor 140 may generate one or more rotated log file templates 142. As explained above, rotated log files 116, 118, 304 may be generated using one or more file name conventions. For example, rotated log files 116, 118, 304 may be named with a numeric identifier, such as the ".1," ".2," . . . suffix depicted in FIGS. 3A-3C, or other suffixes, such as "-1," "-2," . . . or ".log1," ".log2," . The numeric identifier may also be incorporated internally within the file name, such as "servertlog," "server.1.log," and/or "server-1.log." In implementations where the rotated file naming convention is known, the rotated file processor 140 may generate a rotated log file template 142 for the known naming convention (e.g., "server.log.##," where "##" is a wildcard indicator for the numeric identifier). In other implementations where the rotated file naming convention is not known, the rotated file processor 140 may generate a plurality of rotated log file templates 142 for multiple potential naming conventions (e.g., "server.log.##," "server##.log," "server-##.log," and "server.##.log").

The rotated file processor may then identify rotated log files in the log file directory (block 512). For example, the rotated file processor 140 may identify rotated log files 116, 118, 304 in the log file directory of the received log file 112, 114, 208, 306. In particular, the rotated file processor 140 may search the log file directory for one or more matching log files 144 whose file names match one or more of the rotated log file templates 142. Any matching log files 144 may be determined as rotated log files 116, 118, 304 of the log file 112, 114, 208, 306. In FIG. 3C, the rotated log file template 142 may indicate "server.log.##" and the rotated file processor may identify the rotated log file 304 may be identified as a matching log file 144 because its file name 310 of "server.log.1" matching the rotated log file template 142.

The rotated file processor may then search for the context information in the rotated log files (block 514). For example, the rotated file processor 140 may search the rotated log files 116, 118, 304 for the context information 130, 204 stored in the log file initializer. Continuing the example in FIG. 3C, the context information 130, 204 may store lines 1 to 3 (e.g., as shown in FIG. 2), and the rotated file processor 140 may search for the contents of lines 1 to 3 within the rotated log file 304.

If the context information is present (block 516), the logging position updater may locate the updated logging position (block 520). For example, if the context information 130, 204 is present in one of the rotated log files 116, 118, 304, the logging position updater 132 may determine that the updated logging position 148 is located in the rotated log files 116, 118, 304. In one implementation, the logging position updater 132 may determine the updated logging position 148 as the location within the rotated log file 116, 118 after the found context information 130, 204. In other implementations, the logging position updater 132 may determine the updated logging position 148 as the same relative location of the original logging position 128 within the rotated log file 116, 118, 304 that includes the context information. For example, in FIG. 2, the original logging position 206 indicates the end of the log file (i.e., after line 3). At a subsequent instance depicted in FIG. 3C, after identifying the rotated log file 304 and the context information 204 as lines 1 to 3 of the rotated log file 304, the original logging position 206 may be identified as the same position (i.e., after line 3) within the rotated log file 304 as the original logging position 206 within the log file 208.

If the context information is not present (block 516), the rotated file processor may generate a file truncation warning 146 (block 518). For example, if the context information 130, 204 is not present in any rotated log files 116, 118, 304, the rotated file processor 140 may generate a file truncation warning 146. If the context information is not present, then the rotated log file 116, 118, 304 originally corresponding to the received log file 112, 114, 208, 306 may have been deleted as part of a log file rotation procedure. The file truncation warning 146 may then be presented to a user, indicating that at least a portion of the log entries corresponding to the test 106, 108 may not be available because of the log file truncation.

Figure 6:
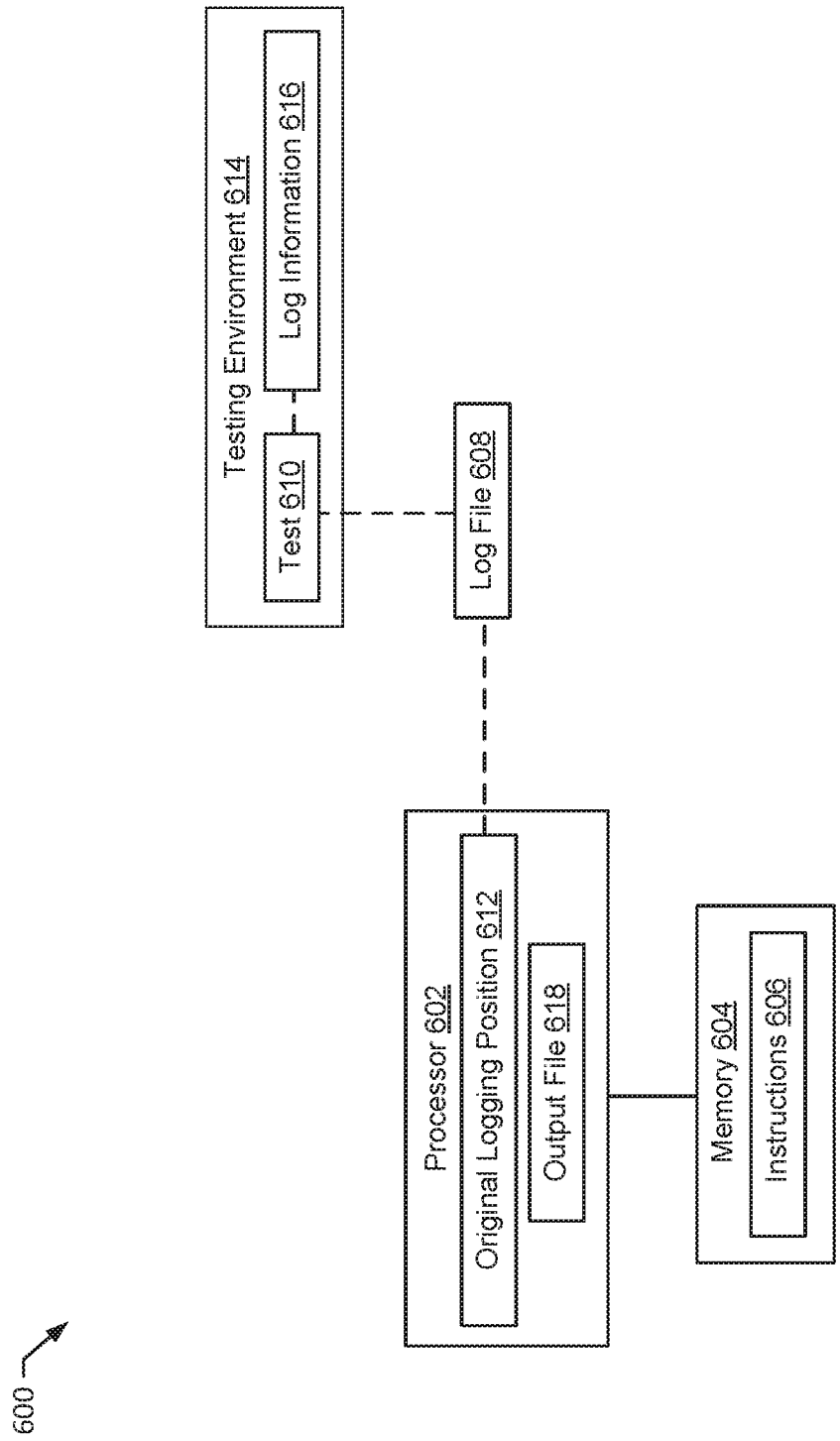
FIG. 6 illustrates a system according to an exemplary embodiment of the present disclosure.

FIG. 6 illustrates a system 600 according to an exemplary embodiment of the present disclosure. The system 600 includes a processor 602 and a memory 604. The memory 604 stores instructions 606 which, when executed by the processor 602, cause the processor 602 to receive a log file 608, which is associated with a test 610, and store an original logging position 612 of the log file 608. The instructions 606, when executed by the processor 602, may also cause the processor 602 to execute the test 610 in a testing environment 614. Executing the test 610 may append log information 616 regarding execution of the test 610 to the log file 608 at the original logging position 612. The instructions 606, when executed by the processor 602, may also cause the processor 602 to create an output file 618 corresponding to the log file 608, locate the original logging position 612 within the log file 608 and copy, starting from the original logging position 612, at least a portion of the log file 608 to the output file 618.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving a log file, wherein the log file stores logging information from previous executions of one or more tests;
storing an original logging position of the log file, the original logging position representing an end of the logging information from the previous executions of the one or more tests;
storing context information for the original logging position of the log file;
executing, after storing the original logging position, a first test in a testing environment, wherein executing the first test causes logging information regarding execution of the first test to be appended to the log file at the original logging position; and
creating, after executing the first test, an output file corresponding to the log file by:
locating the original logging position within the log file by:
calculating a context position of the context information in the log file;
detecting that contents of the log file at the context position match the context information, and
copying, starting from the original logging position, at least a portion of the log file to the output file.

2. The method of claim 1, wherein the context position is an expected location of the context information in the log file, and
wherein locating the original logging position further comprises:
reading contents of the log file starting from the context position.

3. The method of claim 2, wherein the context information includes at least three lines of the log file preceding the original logging position.

4. The method of claim 2, wherein locating the original logging position further comprises:
copying the portion of the log file starting from the original logging position.

5. The method of claim 2, wherein locating the original logging position further comprises:
detecting that contents of the log file at the context position do not match the context information; and
determining that the testing environment generated at least one rotated log file.

6. The method of claim 5, wherein determining that the testing environment generated a plurality of rotated log files comprises:
generating a rotated log file template based on a file name of the log file; and
identifying at least one rotated log file whose name matches the rotated log file template in a log file directory storing the log file.

7. The method of claim 6, further comprising:
searching for the context information in at least a subset of the at least one rotated log file.

8. The method of claim 7, further comprising:
identifying the context information in a matching log file; and
locating an updated logging position in the matching log file based on the context information.

9. The method of claim 7, further comprising:
identifying that the context information is not located in the rotated log files; and
generating a log file truncation warning.

10. The method of claim 1, wherein the original logging position includes at least one of a line number at the end of the log file and a size of log file.

11. The method of claim 1, further comprising repeating the method for each of a plurality of tests, and wherein each of the plurality of tests is executed in a serialized manner such that the testing environment executes only one test at a time.

12. The method of claim 1, wherein the output file is stored in a directory separate from an output directory of the testing environment.

13. The method of claim 1, further comprising:
receiving a plurality of log files associated with the first test; and
performing the method on at least two of the plurality of log files.

14. A system comprising:
a processor; and
a memory storing instructions which, when executed by the processor, cause the processor to:
receive a log file, wherein the log file stores logging information from previous executions of one or more tests;
store an original logging position of the log file, the original logging position representing an end of the logging information from the previous executions of the one or more tests;

store context information for the original logging position of the log file;

execute, after storing the original logging position, a first test in a testing environment, wherein executing the first test causes logging information regarding execution of the first test to be appended to the log file at the original logging position; and create, after executing the first test, an output file corresponding to the log file by locating the original logging position within the log file by:

calculating a context position of the context information in the log file;

detecting that contents of the log file at the context position match the context information, and copying, starting from the original logging position, at least a portion of the log file to the output file.

15. The system of claim 14, wherein the context position is an expected location of the context information in the log file, and wherein the memory stores further instructions which, when executed by the processor while locating the original logging position, cause the processor to:

read contents of the log file from the context position.

16. The system of claim 15, wherein the memory stores further instructions which, when executed by the processor while locating the original logging position, cause the processor to:

copy the portion of the log file starting from the original logging position.

17. The system of claim 15, wherein the memory stores further instructions which, when executed by the processor while locating the original logging position, cause the processor to:

detect that contents of the log file at the context position do not match the context information; and determine that the testing environment generated at least one rotated log file.

18. The system of claim 17, wherein the memory stores further instructions which, when executed by the processor while determining that the testing environment generated a plurality of rotated log files, cause the processor to:

generate a rotated log file template based on a file name of the log file; and identify at least one rotated log file whose name matches the rotated log file template in a log file directory storing the log file.

19. The system of claim 18, wherein the memory stores further instructions which, when executed by the processor, cause the processor to:

search for the context information in at least a subset of the at least one rotated log file;

identify the context information in a matching log file; and locate an updated logging position in the matching log file based on the context information.

20. A non-transitory, computer-readable medium storing instructions which, when executed by a processor, cause the processor to:

receive a log file, wherein the log file stores logging information from previous executions of one or more tests;

store an original logging position of the log file, the original logging position representing an end of the logging information from the previous executions of the one or more tests;

store context information for the original logging position of the log file;

execute, after storing the original logging position, a first test in a testing environment, wherein executing the first test causes logging information regarding execution of the first test to be appended to the log file at or below the original logging position; and create, after executing the first test, an output file corresponding to the log file by locating the original logging position within the log file by:

calculating a context position of the context information in the log file;

detecting that contents of the log file at the context position match the context information, and copying, starting from the original logging position, at least a portion of the log file to the output file.

* * * * *